Feb. 23, 1932.          C. W. SPEIRS          1,846,279
     MEANS FOR MOLDING ARTICLES FROM A SLIP OR PLASTIC MASS
                 Filed April 26, 1928      3 Sheets-Sheet 1
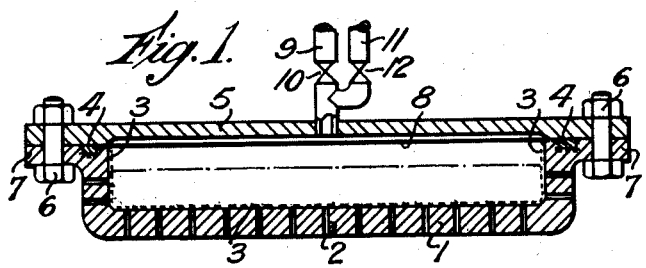
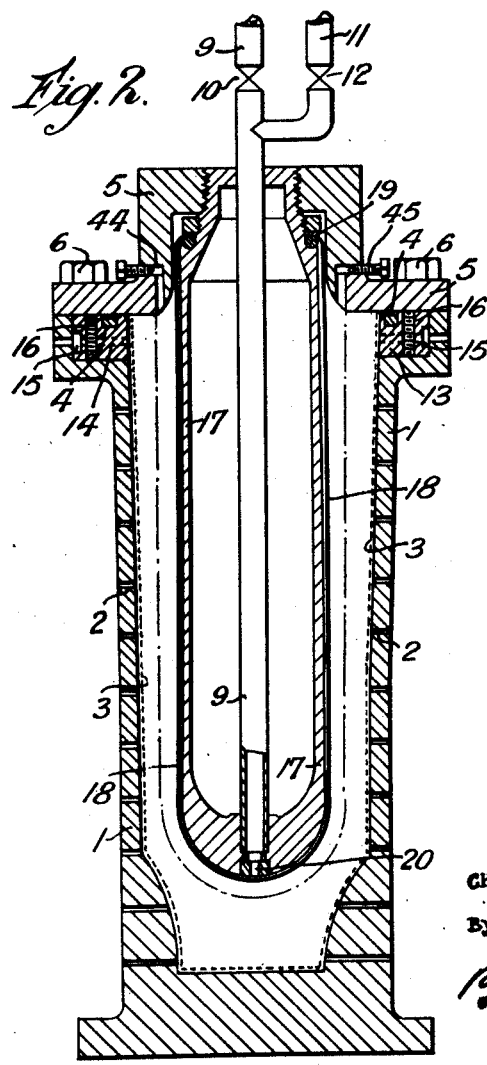
INVENTOR
CHARLES W. SPEIRS,
By his Attorneys,

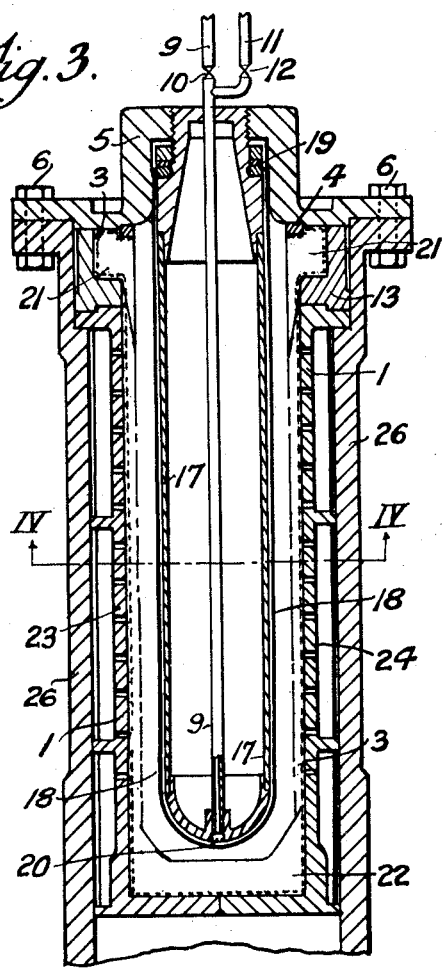
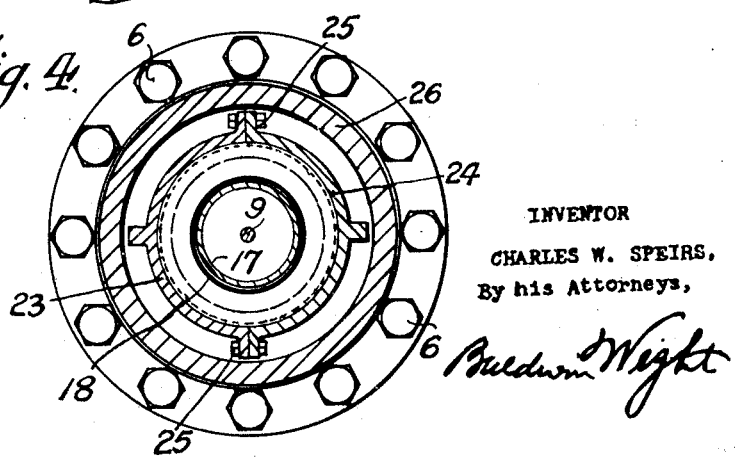

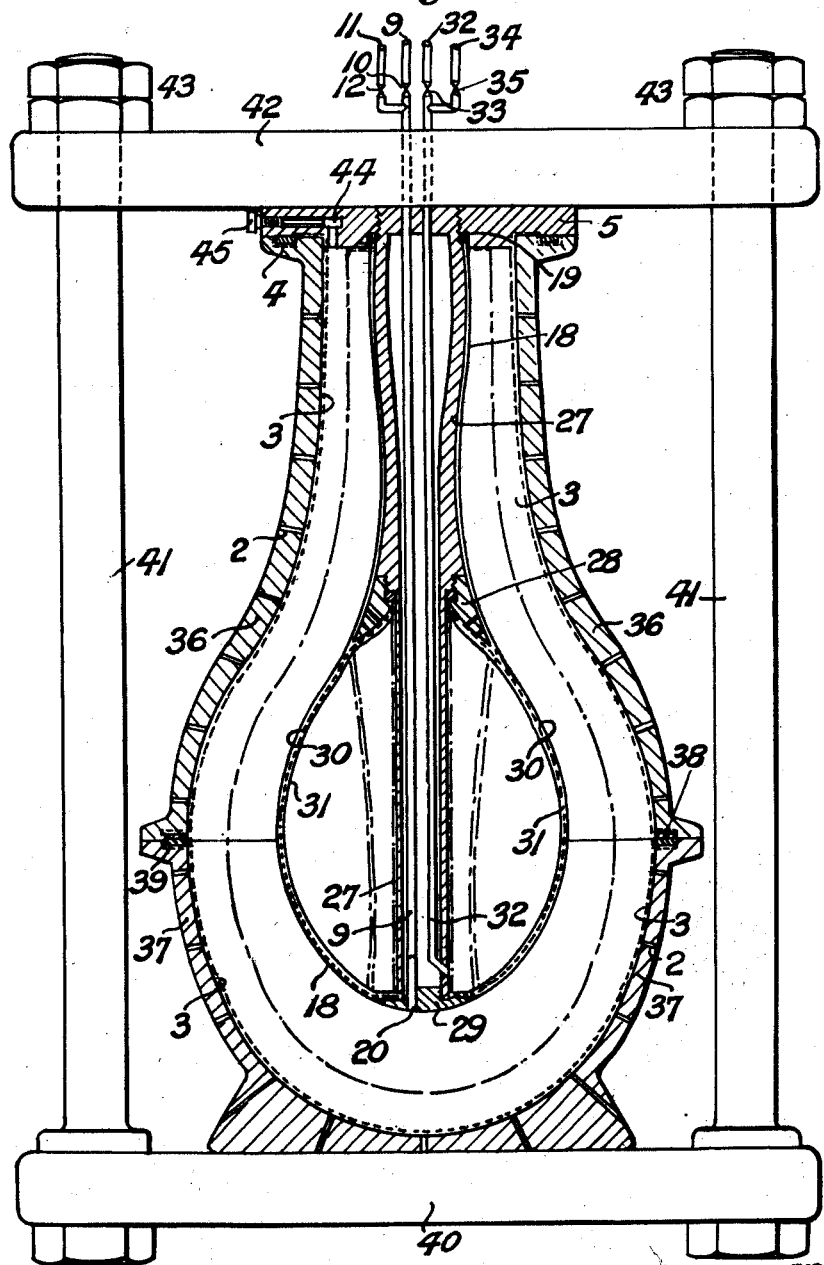

Patented Feb. 23, 1932

1,846,279

UNITED STATES PATENT OFFICE

CHARLES WILLIAM SPEIRS, OF LONDON, ENGLAND, ASSIGNOR TO THE MORGAN CRUCIBLE COMPANY, LIMITED, OF LONDON, ENGLAND

MEANS FOR MOLDING ARTICLES FROM A SLIP OR PLASTIC MASS

Application filed April 26, 1928, Serial No. 273,092, and in Great Britain February 6, 1928.

The present invention relates to methods and/or means for casting articles from liquid "slip", by applying pressure to the slip which is being cast, in order to expel liquid from the material or to consolidate the material and form a shaped article sufficiently firm to be handled.

The term "liquid slip" is intended to cover a mixture of ceramic material with sufficient water or other liquid to enable it to be poured freely into a vessel or mold so that it will fill all parts of that mold or vessel.

Heretofore a method commonly employed in casting liquid slip has been to pour the liquid slip into a mold made of porous material, such as plaster of Paris, to leave the slip in the mold for a given time, and then to drain off the slip which is still liquid, the thickness of the casting thus obtained being dependent on the time the slip is left in the mold. This method possesses certain disadvantages, one of them being that a considerable time (especially in the case of massive castings) must elapse before the casting is sufficiently firm to handle. Another disadvantage is that the casting as it loses its moisture shrinks from the mold, so that it does not accurately correspond to the dimensions of the mold.

The object of the present invention is to provide a method and/or means for casting liquid slip in which the first mentioned disadvantage is very greatly minimized, while the second disadvantage is also greatly minimized if not wholly eliminated.

It has further been found that articles cast in accordance with the present invention have a more regular and uniform grain and are freer from air pockets than those made in the usual manner.

Further, since the small quantity of moisture remaining in the article is almost uniform throughout the whole mass, the slight shrinkage which occurs after the article leaves the mold is uniform throughout the mass, and no strains are set up in the final drying and burning of the article.

In carrying out the invention, the requisite amount of liquid slip to form a given article is poured into a perforated mold (i. e. as distinct from a mold made of porous material such as plaster of Paris) and sufficient moisture to render the article sufficiently firm to handle is then removed from the slip by pressure applied through flexible material such as rubber.

It will be found in general that hydraulic or other fluid pressure is the most suitable means for applying pressure, in which case it is preferably transmitted through flexible extensible material, such as rubber. It will be seen that since the rubber is supported on both sides, great pressure can be employed.

In one way of casting a plate according to the invention, the requisite quantity of liquid slip is poured into a perforated mold, a thin sheet of rubber is laid on top of the slip and a fluid tight joint is made between the edges of the sheet and the mold. Water or air is then supplied under pressure to the upper surface of the rubber sheet, the moisture being thereby expelled from the slip through the perforations in the mold, which latter is preferably lined with filter cloth. The pressure is maintained until no further moisture is expelled or until the article is sufficiently firm to handle.

The surface of a slab made as above may be slightly concave and if a plane surface be required, a cutter may be employed to obtain a slab with a true surface and of the necessary thickness. If desired, slabs or plates can be built up of one or more different materials cast one upon the other and forming one solid mass; for instance, in the manufacture of resistors, for which the invention is applicable, and which are used as electric heating elements, the first layer consists of an insulating material, the second layer of a conducting material, and the third layer again of an insulating material.

When casting a hollow article from liquid slip, I provide a core formed of flexible extensible material, such as rubber, to which water or other fluid is supplied under pressure. The perforated mold which is of fixed configuration (i. e. dimensions) corresponding to that required for the article is filled with the requisite quantity of liquid slip to form the said article, and the mold sealed. In most cases it is advantageous to provide means for maintaining the core in its proper shape until fluid pressure is applied. Such means may conveniently comprise (when the shape of the article allows it) a hollow metal core with a rubber bag fitted outside it, while in the case of an article having a narrow neck, as, for example, in certain forms of retorts, the rubber core, in the form of a bag, may have (up till the time that hydraulic pressure is applied) the proper shape imparted to it by means of an inner core formed of flexible, inextensible material, such as rubber covered canvas, so constructed that when inflated by air or other fluid under pressure, it takes the correct form of the core. With such a construction the core and canvas lining can, when deflated, be passed through the neck of the mold into the interior and removed therefrom after the casting process has been completed.

When forming a hollow article, the effective capacity of the mold, i. e. the space between the outer walls of the core and the inner walls of the mold, is such that when the requisite quantity of slip necessary to form the article is poured into the mold, the mold, i. e. the effective space thereof, is filled.

It is obvious that a greater quantity of liquid slip than is requisite may, if desired, be supplied to the mold, provided the surplus slip be allowed to drain off, or be expelled or removed before the hydraulic or other fluid pressure (other than that required to compel the core to take its proper shape) is applied.

It may also be observed that although the inner surface of an article made by this process and apparatus is usually accurate in shape and dimensions, means, such as a cutter, may, if desired, be provided to true the inner surface. In cases where such means are provided, the mold may be supplied with a quantity of slip slightly in excess of that which is necessary, the surplus material being removed by the cutter at the end of the casting process. If this method be adopted, the quantity of slip and/or the percentage of water contained in the slip, need not be accurately determined as is the case where the accuracy of any given casting is dependent on the exact requisite quantity of slip to form that casting being supplied to the mold.

It has been found that in the case of a casting of, say, a crucible or bath, which under the processes commonly in use took, for example, six weeks before it was sufficiently firm to handle, a similar casting can be made according to the present invention, in approximately forty-eight hours. Moreover, since, during the whole time that the water is being removed from the casting by fluid pressure, the casting is being forced on to the mold, the casting is prevented from shrinking from the walls of the mold, and further, the interior surface of the casting is also under pressure during the casting process, so that the interior of the article being cast is constrained to take the shape of the mold.

It will also be seen that since the thickness of a hollow article cast by this process is regulated by the distance between the core and the walls of the mold, an article can readily be cast having any desired thickness at any given part thereof.

It has also been found that an article made according to this invention can readily be cast on to and make a perfect joint with ceramic material in a plastic state, which has previously been formed either into a special formation or made of ceramic material whose physical qualities differ from those of the slip about to be cast.

The invention is illustrated in the accompanying drawings, in which Figure 1 is a sectional elevation of one form of apparatus, and Figure 2 a sectional elevation of a modified form of apparatus. Figure 3 is a sectional elevation and Figure 4 a section on the line IV—IV, Figure 3, of a modified form of apparatus employed for uniting pre-formed ceramic material with that about to be cast and Figure 5 is a sectional elevation of a further modification.

Referring more particularly to Figure 1, 1 is a mold provided with perforations 2 and lined with filter cloth 3 passed under a clamping ring 4 which extends into a circumferential recess formed in the mold 1. 5 is a mold cover plate adapted to be secured by nuts and bolts 6 to flanges 7 on the mold 1. 8 is a sheet of rubber or like material which is clamped between the flanges 7 and the cover plate 5. The space between the face of the sheet 8 and the inner face of the cover plate 5 forms a chamber to which fluid, such as water, under pressure can be admitted through a pipe 9 having a control valve 10, and from which the fluid can escape through a pipe 11, having a control valve 12.

In operation, that quantity of liquid slip necessary to form the article is poured into or placed in the mold 1 and the rubber sheet 8 placed in position and clamped by securing the cover plate 5 to the mold 1.

The valve 10 is then opened, whereby the pressure of the fluid is transmitted to the material in the mold, so that the moisture contained in the slip is expelled through the filter cloth 3 and perforations 2. The pressure is maintained until no further moisture is expelled, or until the slip is sufficiently firm to handle, this occurring when, for example, the rubber sheet has stretched to the position shown in chain dotted lines.

The valve 10 is then closed and the valve 12 opened to allow the fluid to escape, the cover plate 5 and rubber sheet 8 removed, and the filter cloth 3, together with the cast material, withdrawn from the mold 1, the filter cloth then being stripped from the molded article.

The mold illustrated in Figure 1 is particularly suitable for use in manufacturing resistor plates from slip, the plate so formed being very homogeneous in character and grain.

It will be seen that even if the surface of the article to be cast be not plane, or if its surface be irregular, the flexibility of the rubber 8 enables it to conform to the surface and thereby to produce a homogeneous article.

Referring now to Figure 2, in which is illustrated apparatus for casting a hollow article, the configuration, (i. e. dimension) of the mold 1 is fixed and is, as before, lined with filter cloth 3 which, in this case, however, is clamped by the ring 4 to an annular member 13, positioned by a circumferential recess formed in the mold 1. The member 13 is formed with perforations 14 in communication with a circumferential groove 15 in communication with one or more of the perforations 2 in the mold 1, the said member 13 being also formed with screwed holes 16 adapted to receive the screwed shanks of lifting hooks (not shown). To the cover plate 5, which as in Figure 1 is secured to the mold 1 by nuts and bolts 6, is secured a core 17 of a shape similar to that which it is desired to impart to the interior of the article, and 18 is a rubber bag which is clamped at its mouth to the core 17 by a locking ring 19. The space between the inner surface of the bag 18 and the outer surface of the core 17 forms chamber to which the fluid under pressure is supplied through an orifice 20 in communication with the supply pipe 9.

In operation, that quantity of liquid slip necessary to form the finished article is poured into the mold 1. The cover plate 5 and core 17 are then placed in position and secured by the nuts and bolts 6. The valve 10 is now opened, whereby the fluid under pressure causes the bag 18 gradually to expand, for example, to the shape shown in chain dotted lines, the said expansion, as before, causing the moisture to be expelled through the filter cloth 3 and perforations 2. When no further moisture is expelled or when the article is sufficiently firm to handle, the valve 10 is closed, and the valve 12 opened to allow the fluid to escape, thus allowing the bag 18 to return to its original shape.

The nuts and bolts 6 are removed and the cover plate 5 detached from the mold 1. Hooks (not shown) are then screwed into the holes 16 and engaged by any suitable lifting tackle, by means of which the filter cloth 3, and with it the cast article, are removed from the mold.

In the construction illustrated in Figures 3 and 4, the mold 1 is adapted to receive material, such as ceramic material, indicated at 21, 22, which has been formed to the desired shape but is still plastic. After the pre-formed material has been placed in position, liquid slip is poured into the mold and, when the fluid under pressure is supplied to the rubber bag 18, the said slip and pre-formed material will be found to be firmly united. Such an arrangement is particularly suitable for use when it is desired to form an article from ceramic materials, parts of which are of different physical qualities.

In this modification also the mold is formed in two halves 23, 24, normally united by nuts and bolts 25, and the mold is adapted to be inserted within a casing 26 and to be secured therein by the nuts and bolts 6 which serve to secure the mold cover plate 5. When it is desired to remove the article from the mold, the nuts and bolts 6 are removed, the mold withdrawn from the casing 26, and the two halves of the mold separated after the nuts and bolts 25 have been removed. Obviously this arrangement may be applied to the apparatus shown in Figure 2.

Referring now to Figure 5, which illustrates apparatus for casting an article having a narrow neck, the rubber bag 18 is secured to a central hollow stem 27, having flanges 28, 29 the maximum dimensions of which are smaller than the smallest internal dimension of that part of the article through which the flanges have to be withdrawn after the article has been molded.

Secured to the flanges and located within the rubber bag 18 is a canvas bag 30 having a rubber lining 31, the shape of the canvas bag being, when expanded, similar to that which it is desired to impart to the interior surface of the article.

The canvas bag 30 is inflated with fluid supplied by a pipe 32 having a control valve 33, the fluid being allowed to escape when desired by a pipe 34 having a control valve 35.

In this case also the mold 1 is formed in two halves, 36, 37, the filter cloth 3 for each half being clamped by clamping rings 38, 39.

The mold is adapted to be carried upon a base plate 40 to which are secured posts 41, the upper ends of which receive a bolster 42 adapted to engage the cover plate 5 and to be clamped by nuts 43, thus preventing the separation of the two halves of the mold, and of the cover plate, when fluid pressure is transmitted to the bag 18.

In operation liquid slip is supplied to the mold 36, 37, the cover plate 5, and with it the bags 18, 30, 31 (in their deflated position) placed in position, and the bolster 42 clamped in position. The valve 33 is then opened, whereby liquid under pressure inflates the canvas bag 30 to the position shown in full lines in the figure, thus forming the core. The valve 10 is now opened, whereby, as before, the rubber bag 18 is caused gradually to expand and expel the moisture from the material, after which the valves 10 and 33 are closed and the valves 12 and 35 opened to allow the fluid to escape. The bolster 42 is now removed, and the cover plate 5, and with it the collapsed core and bag 18, withdrawn from the molded article. The upper half 36 of the mold is then detached from the lower half 37.

When the molds shown in Figures 2 to 5 are employed for casting articles from liquid slip, overflow passages 44 may, if desired, be provided to allow surplus slip to flow out of the mold, the said passages being sealed by plugs 45, before the fluid under pressure is admitted to the rubber bag 18.

The provision of these passages obviates the necessity for measuring the quantity of slip to form the article.

I claim:—

1. In means for manufacturing an article from liquid slip, the combination of a mold of such effective capacity as to be adapted to receive the requisite quantity of liquid slip for the manufacture of the article, a member of flexible material adapted to co-operate with said mold, and to form a core, means for causing said core to assume the desired shape, comprising an inner core formed of flexible inextensible material, means for applying pressure to said inner core, and means for applying pressure to said core to expel liquid from the slip.

2. In means for manufacturing an article from liquid slip, the combination of a mold of such effective capacity as to be adapted to receive the requisite quantity of liquid slip for the manufacture of the article, a member of flexible material adapted to co-operate with said mold, and to form a core, means for causing said core to assume the desired shape, comprising an inner core formed of flexible inextensible material, means for supplying fluid under pressure to said inner core, and means for supplying fluid under pressure to said core to expel liquid from the slip.

3. In means for manufacturing an article from liquid slip, the combination of a mold of such effective capacity as to be adapted to receive the requisite quantity of liquid slip for the manufacture of the article, a member of flexible and extensible material adapted to co-operate with said mold, and to form a core, means for causing said core to assume the desired shape, comprising an inner core formed of flexible inextensible material, means for applying pressure to said inner core, and means for applying pressure to said core to expel liquid from the slip.

4. In means for manufacturing an article from liquid slip, the combination of a mold of such effective capacity as to be adapted to receive the requisite quantity of liquid slip for the manufacture of the article, a member of flexible and extensible material adapted to co-operate with said mold, and to form a core, means for causing said core to assume the desired shape, comprising an inner core formed of flexible inextensible material, means for supplying fluid under pressure to said inner core, and means for supplying fluid under pressure to said core to expel liquid from the slip.

5. In means for manufacturing a hollow article from liquid slip, the combination of a mold whose fixed configuration corresponds to that required for the article and which has a plurality of small perforations, a closure for the mold, a pressure member cooperating within the closed mold and means for applying pressure to said pressure member, the whole arrangement being such that prior to the application of pressure to the pressure member the mold is of such effective capacity as to be adapted to contain only that quantity of liquid slip necessary for the manufacture of the article to be cast so that when pressure is applied to said member liquid is expelled from the slip through the perforations in the mold and a shaped article of substantially homogeneous material ready for drying, firing, or other finishing processes is formed in a single operation.

6. In means for manufacturing a hollow article from liquid slip, the combination of a mold whose fixed configuration corresponds to that required for the article and which has a plurality of small perforations, a flexible pressure member constituting a core and co-operating with the mold, an inner core formed of flexible inextensible material for maintaining said core in its normal shape until pressure is applied, means for applying fluid pressure to said pressure member, and means for applying fluid pressure to said inner core, the whole arrangement being such that prior to the application of pressure to the pressure member the mold is of such effective capacity as to be adapted to contain only that quantity of liquid slip necessary for the manufacture of the article to be cast, so that when pressure is applied to said member liquid is expelled from the slip through the perforations in the mold and a shaped article of substantially homogeneous material, ready for drying, firing or other finishing processes, is formed in a single operation.

7. In means for manufacturing a hollow article from liquid slip, the combination of a mold whose fixed configuration corresponds to that required for the article and which has a plurality of small perforations, a flexible and extensible pressure member constituting a core and co-operating with the mold, an inner core formed of flexible inextensible material for maintaining said core in its normal shape until pressure is applied, means for applying fluid pressure to said pressure member, and means for applying fluid pressure to said inner core, the whole arrangement being such that prior to the application of pressure to the pressure member the mold is of such effective capacity as to be adapted to contain only that quantity of liquid slip necessary for the manufacture of the article to be cast so that when pressure is applied to said member liquid is expelled from the slip through the perforations in the mold and a shaped article of substantially homogeneous material ready for drying, firing, or other finishing processes is formed in a single operation.

8. In means for manufacturing a hollow article from plastic material, a mold having an internal shape for forming the exterior of the article, an expansible supporting core, an expansible forming core for shaping the interior of the article and in which the supporting core is received, means to expand the supporting core into the general internal contour of and in spaced relation with the interior wall of the mold, and means to expand the forming core to shape the interior of the article.

9. In means for manufacturing a hollow article from plastic material, a mold having an internal shape for forming the exterior of the article, an expansible supporting core, an expansible forming core for shaping the interior of the article and in which the supporting core is received, means to admit fluid under pressure into the supporting core to expand the supporting core into the general internal contour of and in spaced relation with the interior wall of the mold, and means to admit fluid under pressure into the forming core to expand the forming core to shape the interior of the article.

10. In means for manufacturing a hollow article from liquid slip, a perforate mold having an internal shape for forming the exterior of the article, an expansible supporting core, an expansible forming core for shaping the interior of the article and in which the supporting core is received, means to expand the supporting core into the general internal contour of and in spaced relation with the interior wall of the mold, and means to expand the forming core to shape the interior of the article and to expel from the slip the excess liquid whereby to provide a substantially homogeneous material ready for drying, firing, or other finishing processes.

11. In means for manufacturing a hollow article from liquid slip, a perforate mold having an internal shape for forming the exterior of the article, an expansible supporting core, an expansible forming core for shaping the interior of the article and in which the supporting core is received, means to admit fluid under pressure into the supporting core to expand the supporting core into the general internal contour of and in spaced relation with the interior wall of the mold, and means to admit fluid under pressure into the forming core to expand the forming core to shape the interior of the article and to expel from the slip the excess liquid whereby to provide a substantially homogeneous material ready for drying, firing, or other finishing processes.

12. In means for manufacturing an article from liquid slip, the combination of a perforated mold, a flexible pressure member adapted to cooperate with said mold, a supporting ring, a filter sheeting covering the mold perforations within the mold and engaging the ring, and means for applying pressure to said pressure member to expel liquid from the slip, whereby in a single operation there is obtained a shaped article sufficiently firm to be handled and ready for drying, firing or other finishing processes, said ring and filter sheeting being removable with the molded article.

In testimony that I claim the foregoing as my invention, I have signed my name this twelfth day of April, 1928.

CHARLES WILLIAM SPEIRS.